United States Patent [19]

Gnädig et al.

[11] 4,117,583

[45] Oct. 3, 1978

[54] METHOD OF PROVIDING A WEAR-RESISTANT LINING IN THE WORK CHAMBER OF A SCREW EXTRUDER

[75] Inventors: Gerhard Gnädig, Ditzingen; Wilhelm Seufert, Korntal, both of Germany

[73] Assignee: Werner & Pfleiderer, Stuttgart, Germany

[21] Appl. No.: 750,705

[22] Filed: Dec. 15, 1976

[30] Foreign Application Priority Data

Dec. 24, 1975 [DE] Fed. Rep. of Germany ....... 2558611

[51] Int. Cl.² .............................................. B23P 11/02
[52] U.S. Cl. ...................................... 29/447; 29/459; 425/208; 366/83
[58] Field of Search ................ 29/447, 458; 259/192, 259/104, 191; 425/208; 156/293, 294

[56] References Cited

U.S. PATENT DOCUMENTS

| | | | |
|---|---|---|---|
| 2,519,014 | 8/1950 | Bankey | 425/208 |
| 3,308,524 | 3/1967 | Moyer | 29/458 X |
| 3,382,563 | 5/1968 | Barroil et al. | 29/447 |
| 3,496,603 | 2/1970 | Listner et al. | 425/208 X |
| 3,632,255 | 1/1972 | Geyer | 425/208 X |
| 3,718,956 | 3/1973 | Sekimoto et al. | 29/447 UX |
| 3,900,188 | 8/1975 | Seufert | 425/208 X |

*Primary Examiner*—Charlie T. Moon
*Attorney, Agent, or Firm*—Browdy and Neimark

[57] ABSTRACT

A wear-resistant lining is provided in the work chamber of a screw extruder by providing an internal cavity in the extruder housing of a shape corresponding to the external cross-section of a wearing insert but sufficiently larger such that a gap of predetermined width is provided between the walls. A layer of soft, hardenable material is applied to the outer surface of the wearing insert to a thickness slightly greater than the gap. The extruder housing is heated until the cavity expands to a degree sufficient to allow insertion of the insert. The insert is then placed into the cavity and the material is allowed to harden, as by heat hardening due to the temperature of the extruder housing.

11 Claims, 4 Drawing Figures

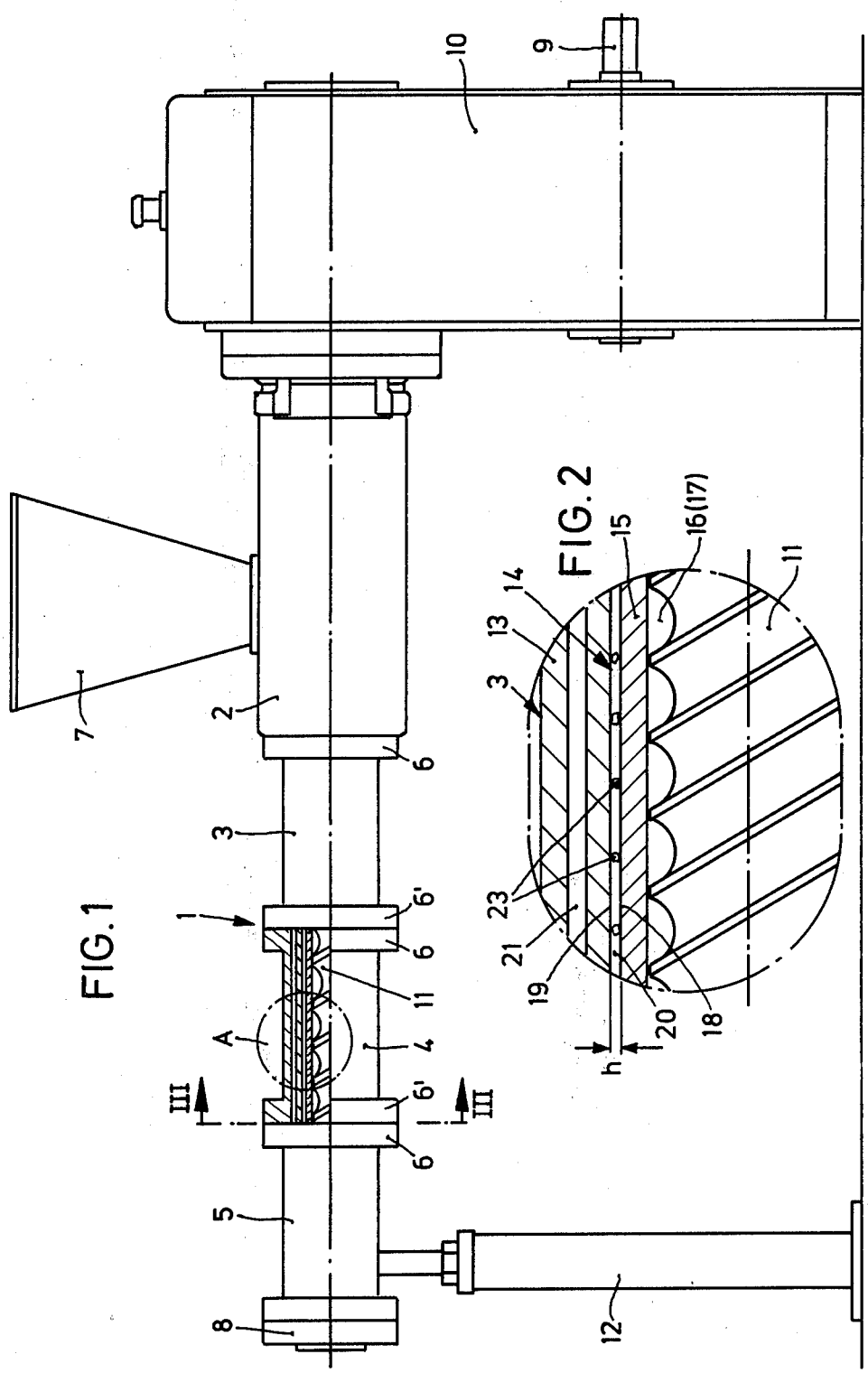

4,117,583

METHOD OF PROVIDING A WEAR-RESISTANT LINING IN THE WORK CHAMBER OF A SCREW EXTRUDER

FIELD OF THE INVENTION

The present invention relates to a method of providing a wear-resistant lining for the work chamber of a screw extruder, particularly but not exclusively a multiple-shaft screw extruder and to the screw extruder having an improved wearing protective lining so produced.

BACKGROUND OF THE INVENTION

In a known method of making wear resistant lining, which is disclosed in U.S. Pat. No. 3,900,188, a screw extruder is provided with a wearing barrel which is inserted into a cavity in the extruder housing. The barrel is fixed there temporarily in the desired position, and the interstice between the external wall of the wearing barrel and the internal wall of the cavity is filled in with a castable material, the melting point of which is lower than the melting point of the wearing barrel material and than the melting point of the extruder housing material.

It is likewise already known, and generally customary in practice, to shrink-fit wearing barrels into the cavities of the extruder housings. This known method suffers from the following disadvantages: Both the internal wall of the cavity in the extruder housing and the external wall of the wearing barrel must be machined to an exact shrinkage dimension. The geometry of the oval or figure-of-eight shaped surfaces of the wearing barrel and of the cavity necessitates a large outlay of time, special machines and special measuring techniques for these machining operations. During the shrinking process the actual thermal expansions are variable with respect to the horizontal and vertical dimensions in the cross-sectional plane of the extruder housing. This results in differential contractions when the extruder housing cools down, and hence a non-uniform contact of the external wall of the wearing barrel with the internal wall of the caviity of the extruder housing. Owing to the only partial contact of the contact surfaces, an unsatisfactory heat transfer results; furthermore, the strength of the component comprising the extruder housing as well as that of the wearing barrel, is disadvantageously influenced. In this case also a satisfactory sealing cannot be obtained between the wearing barrel and the extruder housing, so that, particularly when corrosive substances are processed, they can penetrate into the gap between the wearing barrel and the cavity and lead to corrosion phenomena there. For this reason a costly welding together of wearing barrel and extruder housing is necessary, but this again is only possible if the wearing barrel and the extruder housing consist of weldable materials. This leads to a restriction in the choice of materials, more particularly as regards the wearing barrels. This welding increases the difficulty of repairs, because in order to extract the wearing barrels from the extruder housing, the welded joints must first of all be eliminated and then be reworked subsequently on a fresh wearing barrel. This involves the risk of thermal distortion of the extruder housing.

These disadvantages which have been described are in fact eliminated by the method first described above; but in that case casting gaps are required between the external wall of the wearing barrel and the internal wall of the cavity which are larger than 1 millimeter, in order that the castable material can be cast in to fill the interstice completely. Such wide gaps, however, considerably reduce the strength of the component comprising the extruder housing and the wearing barrel.

It is therefore the underlying aim of the present invention to develop further the method of the type initially described so that by reducing the gap width required between wearing barrel and extruder housing, the strength of the overall component is increased.

SUMMARY OF THE INVENTION

According to the present invention, there is provided a method of providing a wear-resistant lining for a work chamber of a screw extruder comprising a wearing barrel attached in a thermally conductive manner to the extruder housing. In this method, the wearing barrel is inserted into a sufficiently large cavity in the extruder housing, adapted in its cross section to the external cross section of the wearing barrel, and the interstice remaining between the external wall of the wearing barrel and the internal wall of the cavity is filled with soft material which subsequently becomes hard. The material is applied in a layer onto the external wall of the wearing barrel in a thickness which is at least equal to the gap width of the interstice between the external wall of the wearing barrel and the internal wall of the extruder housing, the extruder housing is heated and the wearing barrel coated with the material is inserted into the cavity in the housing enlarged by said heating.

The present invention also provides a screw extruder comprising a wearing barrel attached in a thermally conductive manner to the housing of the extruder to define a work chamber, the wearing barrel being inserted into a cavity in the housing with a predetermined interstice therebetween, said interstice being filled with an initially plastic material which subsequently hardens to secure the wearing barrel to the housing to define a wear-resistant lining to the work chamber.

The application of the material onto the external wall of the wearing barrel is very much simpler than casting a melt into the interstice between the wearing barrel and the extruder housing. When the extruder housing cools down, the material, initially still soft, fills the interstice between the wearing bushing and the extruder housing whilst compensating for production tolerances. It has been found advantageous if the extruder housing, which customarily consists of steel, is heated to a temperature of 200° to 300° C. In order that the overall component comprising wearing barrel and extruder housing shall acquire adequate overall strength, according to an advantageous feature of the invention, age-hardening material or material which is hardenable under the influence of time as well as other influences such as heating, is used. Mineral and/or metallic powders are advantageously added to the material as adjuvants. If, according to a particularly advantageous further development of the invention, the additives exhibit a granulometry which is approximately equal to the gap width between the external wall of the wearing barrel and the internal wall of the cavity, then a direct thermal conduction is achieved from the external wall of the wearing bushing through these additives to the internal wall of the cavity and hence to the extruder housing, which leads, more particularly if metallic powders are used as additives, to a thermal conduction which is practically equivalent to that of an integral construction of wearing barrel and extruder housing.

The age-hardening or hardenable materials used are advantageously cement, synthetic resin bonded ceramic compositions or synthetic resin, such as epoxide resins, polyester resins, polyamides or the like.

If a hot age-hardening resin is used as material, then the method of production according to the invention is still further simplified if the heating temperature of the extruder housing is adjusted to the age-hardening temperature of the resin. In this case, therefore, the heating of the resin to the age-hardening temperature is effected by the heat stored in the heated extruder housing.

In a wear-resistant lining produced by the method according to the invention, the gap width of the interstice between the exterior wall of the wearing barrel and the interior wall of the cavity is advantageously 0.1 to 0.5mm, these statements being referred in each case to the extruder housing and the wearing barrel in the cold condition. In this case the application of the material to the external wall of the wearing barrel is made at a layer thickness < 1.0 mm.

BRIEF DESCRIPTION OF THE DRAWINGS

An embodiment of the invention will now be described by way of example and with reference to the accompanying drawings, in which:

FIG. 1 shows a side elevation of a screw extruder with a wear-resistant lining, with part of the housing in section, FIG. 2 shows an enlarged partial section of FIG. 1.

DETAILED DESCRIPTION OF PREFERRED EMBODIMENTS

Figure 3:
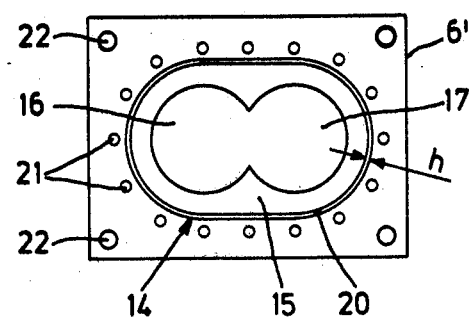
FIG. 3 shows a section made along the line of section III—III in FIG. 1.

A screw extruder, which is for example a screw injection molding machine, comprises a housing 1 which consists of an inlet housing section 2, two partial housing sections 3, 4 and a discharge housing section 5. The housing sections each exhibit at their ends connecting flanges 6, 6′ by means of which the individual sections are attached together in axial alignment. The inlet housing section 2 has a charging hopper 7, and an ejection mouthpiece 8 adjoins the discharge housing section 5. A motor, not shown, drives, through a shaft 9 and through a transmission 10, two screws 11 arranged in parallel beside each other, of which only one is visible in FIG. 1. In the region of the discharge end, the housing 1 is supported on a column 12. The region A encircled by a chain-dotted line in FIG. 1 is shown on a larger scale in FIG. 2. According to this FIGURE a partial housing section 3 comprises a thick wall section 13 in which a cavity 14 is made which extends in the longitudinal direction of the housing 1. Into this cavity 14 there is inserted a wearing barrel 15 which exhibits two axially parallel circular cylindrical bores 16, 17 partly mutually intersecting, in which the screws 11 are arranged. The wearing barrel 15 is usually made of a highly wear-resistant metallic material. As will be clear from FIG. 3, the integral wearing barrel 15 exhibits an external cross section which is constituted by two semicircular lines and by two straight lines joining the semicircles tangentially together. The precise construction and the advantages of such a wearing barrel are described in U.S. Patent application Ser. No. 576,019, now U.S. Pat. No. 4,028,027, assigned to the same assignee as the present application, which is hereby incorporated by reference. The cavity 14 in the partial housing section 3 exhibits a similar external cross section, while the cross section of the cavity 14 is larger than the external cross section of the wearing barrel 15 to leave an interstice 20 with a gap width $h = 0.1$ to $0.5$ mm between the external wall 18 of the wearing barrel and the internal wall 19 of the cavity 14. It is particularly emphasized that for reasons of clarity the gap width $h$ of the interstice 20 is shown greatly exaggerated in the drawing.

Axially parallel channels 21 for a heat control medium are arranged in the thick walled section 13 of the partial housing section 3. Bores 22 (FIG. 3) are made in the connected flanges 6, 6′, through which the individual partial sections of the housing 1 can be attached together by means of appropriate tie rods or bolts.

Figure 4:
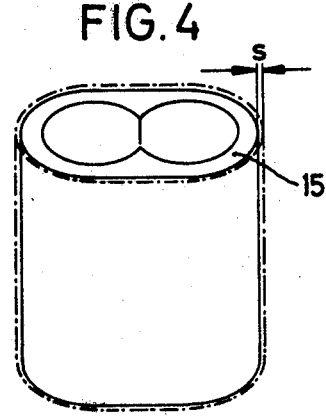
FIG. 4 shows a wearing barrel in perspective view.

Before the wearing barrel 15 is inserted into the cavity 14, the external wall 18 of the wearing barrel 15 is coated with a material to a layer thickness $s$ (FIG. 4) which is greater than the gap width $h$. Starting from a gap width $h = 0.1$ to $0.5$ mm, the layer thickness may be $s < 1$ mm. The material contains metallic or ceramic additives having a granulometry which corresponds approximately to the gap width $h$. FIG. 2 shows some such metallic or ceramic granules 23, which are in contact on the one hand with the external wall of the wearing barrel 15 and on the other hand with the interior wall 19 of the partial housing section 3. These granules 23 are again shown greatly exaggerated in size in the drawing.

Before or after the material is spread on to the external wall 18 of the wearing barrel 15, the partial housing section 3, which consists of customary structural steel, is heated to 200° to 300° C, so that due to the thermal expansion the cavity also becomes sufficiently large to permit the wearing barrel 15 provided with the layer of material to be inserted into the cavity 14 without difficulty. Thus, during the subsequent cooling of the partial housing section 3, the interstice 20 becomes entirely filled by the material, whilst any possible excess material is extruded in the region of the connecting flanges 6 and 6′. In the case of heat hardening materials the heating temperature of the partial housing section 3 is chosen so that the heat surrendered by the partial housing section 3 to the material is sufficient for the hardening of the material.

Materials which may be considered for bonding the wearing barrel 15 into the cavity 14 include epoxide resins, polyester resins, polyamides or polyimides. The following relationship between hardening temperature and hardening time are approximately valid for an average epoxide resin:

| Hardening temperature in ° C | Hardening time in minutes |
|---|---|
| 200 | 30 |
| 250 | 10 |
| 280 | 5 |

No temperature fixing of the wearing barrel 15 in the cavity 14 during the hardening is necessary. The wearing barrel 15 coated with the material is pushed into the cavity 14 of the partial housing section 3, which has been enlarged by heating. Due to the layer of material applied (adhesive layer) good centering is immediately obtained during the insertion. Any equalization in the position of the wearing barrel 15 can still take place during the cooling of the partial housing section 3, during which a contraction — i.e. a constriction of the cavity 14 — occurs on all sides. Since the final machining of the bores 16, 17 is only performed after the material has hardened, the final position correction of the bores 16, 17 can then be undertaken.

There is only one basic condition the filling material must fulfil: It must withstand at least the heating temperature of the extruder housing.

Furthermore it should adhere to metallic surfaces, because the extruder housing and the wearing barrel are made of metal. Such materials are in normal commercial usage.

In order to exchange the wearing barrel 15, the entire partial housing section 3 is heated to a temperature at which the strength of the material — i.e. the adhesive bond — strongly decreases, which is the case e.g. at 400° to 450° C. At such a temperature the wearing barrel 15 can easily be pushed out of the cavity 14. Material having such properties are in normal commercial usage, too. The interior wall 19 must then be cleaned before a new wearing barrel is inserted.

It will be obvious to those skilled in the art that various changes may be made without departing from the scope of the invention and the invention is not to be considered limited to what is shown in the drawings and described in the specification.

We claim:

1. A method for providing a wear-resistant lining for a work chamber of a screw extruder having a wearing barrel of non-circular external cross-section attached in a thermally conductive manner to the extruder housing, the internal cross-section of the screw extruder housing being of corresponding non-circular cross-section but slightly larger than the external cross-section of the wearing barrel so to define an interstice having a given gap width, comprising:

adding mineral and/or metallic particles as additives to a soft material which is to subsequently become hard, at least some of said particles having a granulometry substantially equal to said gap width and none of said particles having a granulometry greater than said gap width;

applying a layer of said soft material, which subsequently becomes hard with said mineral and/or metallic particles therein onto the external surface of the wearing barrel, said layer having a thickness which is greater than said gap width of said interstice between the external wall of said wearing barrel and the internal wall of said extruder housing;

heating said extruder housing to an extent sufficient to sufficiently enlarge the interior of said extruder housing to allow said wearing barrel having said layer of material in soft condition to be inserted therein; and inserting said wearing barrel having said layer of material in soft condition hereon into the heater enlarged said extruder housing.

2. The method in accordance with claim 1, wherein the extruder housing is heated to a temperature of 200° to 300° C.

3. The method in accordance with claim 1, wherein age-hardening material is used for the material applied onto the external surface of said wearing barrel.

4. The method in accordance with claim 1, wherein the particles have a granulometry which is substantially equal to the gap width between the external wall of the wearing barrel and the internal wall of the cavity.

5. The method in accordance with claim 1, wherein the material applied onto the external surface of said wearing barrel is a cement.

6. The method in accordance with claim 1, wherein the material applied onto the external surface of said wearing barrel consists of a synthetic resin bonded ceramic compound.

7. The method in accordance with claim 1, wherein the material applied onto the external surface of said wearing barrel is a synthetic resin.

8. The method in accordance with claim 1, wherein the material applied onto the external surface of said wearing barrel is a thermosetting resin and the heating temperature of the extruder housing is adjusted to the hardening temperature of the resin.

9. The method in accordance with claim 1, wherein the material is applied to the external layer of the wearing barrel with a layer thickness less than 1.0 mm.

10. The method in accordance with claim 1, wherein the gap width of the interstice between the external wall of the wearing barrel and the internal wall of the housing is between 0.1 mm and 0.5 mm.

11. The method in accordance with claim 1, wherein said material applied onto the external surface of said wearing barrel is selected from the group consisting of epoxide resins, polyester resins, polyamides and polyimides.

* * * * *